United States Patent
Ikegami

(10) Patent No.: US 10,082,938 B2
(45) Date of Patent: *Sep. 25, 2018

(54) ELECTRONIC DEVICE, CONTROL METHOD, AND CONTROL PROGRAM

(71) Applicant: KYOCERA Corporation, Kyoto (JP)

(72) Inventor: Takashi Ikegami, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 296 days.

This patent is subject to a terminal disclaimer.

(21) Appl. No.: 14/602,819

(22) Filed: Jan. 22, 2015

(65) Prior Publication Data

US 2015/0169198 A1    Jun. 18, 2015

Related U.S. Application Data

(62) Division of application No. 13/468,501, filed on May 10, 2012, now Pat. No. 8,963,860.

(30) Foreign Application Priority Data

May 10, 2011    (JP) .................................. 2011-105723

(51) Int. Cl.
*G09G 5/00* (2006.01)
*G06F 3/0484* (2013.01)
(Continued)

(52) U.S. Cl.
CPC ........ *G06F 3/04842* (2013.01); *G06F 3/0486* (2013.01); *G06F 3/0488* (2013.01); *G06F 3/04883* (2013.01)

(58) Field of Classification Search
CPC ............... G06F 3/03547; G06F 3/0416; G06F 3/04842; G06F 3/0486; G06F 3/0488; G06F 3/0482; H04M 1/2477; H04N 1/00408

(Continued)

(56) References Cited

U.S. PATENT DOCUMENTS 7,900,145 B2    3/2011    Bklinnikka
8,584,050 B2    11/2013   Ording et al.
(Continued)

FOREIGN PATENT DOCUMENTS

JP    10247988 A    9/1998
JP    10301869 A    11/1998
(Continued)

OTHER PUBLICATIONS

Notice of Reasons for Rejection issued to JP Application No. 2011-105723, dated Aug. 19, 2014.
Office Action in U.S. Appl. No. 14/602,852 dated Jan. 3, 2017.

*Primary Examiner* — Jennifer Nguyen
(74) *Attorney, Agent, or Firm* — Hauptman Ham, LLP

(57) ABSTRACT

An electronic device includes a display unit, a detection unit, and a control unit. The display unit displays a character string or an image. The detection unit detects contact with the display unit. In a state where a character string or a image is displayed on the display unit, in a case in which the detection unit detects contact with the character string or the image, the control unit causes at least a part of the character string or the image to be selected in accordance with such detection. The control unit activates a different function in accordance with a condition of contact with the character string or the image when the character string or the image is selected. Furthermore, the control unit causes the character string or the image thus selected to be utilized in the function thus activated.

8 Claims, 16 Drawing Sheets

(51) Int. Cl.
*G06F 3/0488* (2013.01)
*G06F 3/0486* (2013.01)

(58) Field of Classification Search
USPC .................................. 345/173; 715/810, 863
See application file for complete search history.

(56) References Cited

U.S. PATENT DOCUMENTS

| 2006/0132456 | A1  | 6/2006 | Anson |           |
|---|---|---|---|---|
| 2008/0174568 | A1* | 7/2008 | Kim ................... | G06F 3/04883 |
|              |     |        |       | 345/173 |
| 2009/0158149 | A1* | 6/2009 | Ko ..................... | G06F 3/04883 |
|              |     |        |       | 715/702 |
| 2009/0195515 | A1* | 8/2009 | Lee .................... | G06F 3/04817 |
|              |     |        |       | 345/173 |
| 2010/0192108 | A1* | 7/2010 | Liu .................... | G06F 3/04883 |
|              |     |        |       | 715/863 |
| 2010/0277431 | A1* | 11/2010 | Klinghult ............. | G06F 3/0412 |
|              |     |        |       | 345/174 |
| 2010/0295805 | A1  | 11/2010 | Shin et al. | |
| 2011/0054837 | A1  | 3/2011 | Ikeda | |
| 2011/0181504 | A1* | 7/2011 | Ishikawa ............... | G06F 3/0237 |
|              |     |        |       | 345/156 |
| 2011/0227844 | A1  | 9/2011 | Kim | |
| 2011/0239110 | A1  | 9/2011 | Garrett et al. | |
| 2015/0169199 | A1* | 6/2015 | Ikegami ................ | G06F 3/0488 |
|              |     |        |       | 715/835 |

FOREIGN PATENT DOCUMENTS

| JP | 2001175408 A | 6/2001 |
|---|---|---|
| JP | 2007-200243 A | 8/2007 |
| JP | 2008134918 A | 6/2008 |
| JP | 201148666 A | 11/2008 |
| JP | 2010176575 A | 8/2010 |
| JP | 2010210312 A | 9/2010 |

* cited by examiner

FIG. 7A
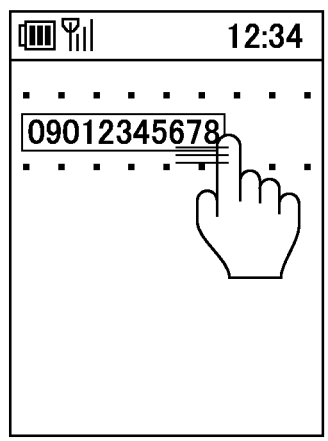
FIG. 7B

1. COMPANY A
2. COMPANY B
3. COMPANY C

A. CELLULAR TELEPHONE
B. PHS

1. COMPANY A
2. COMPANY B
3. COMPANY C

A. CELLULAR TELEPHONE
B. PHS

1. COMPANY A
2. COMPANY B
3. COMPANY C

A. CELLULAR TELEPHONE
B. PHS

SEARCH WEB
COMPANY A, PHS

CELLULAR TELEPHONE, PHS

COMPANY A'S CELLULAR TELEPHONE, PHS

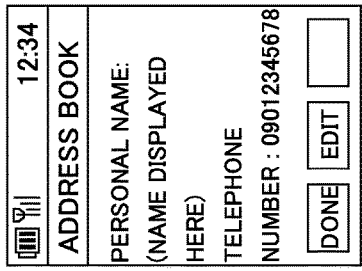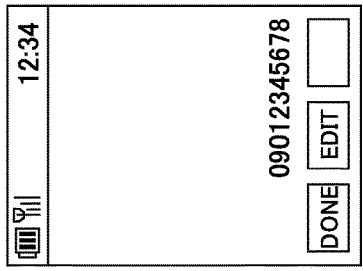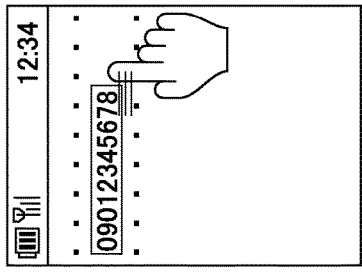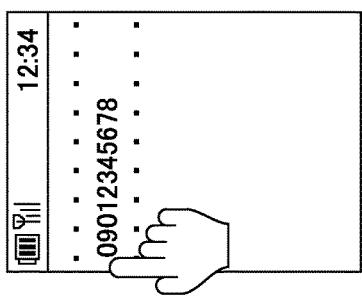

ELECTRONIC DEVICE, CONTROL METHOD, AND CONTROL PROGRAM

CROSS-REFERENCE TO RELATED APPLICATIONS

This application is a divisional of U.S. patent application Ser. No. 13/468,501 filed on 10 May 2012, which claims the benefit of priority from Japanese Patent Application No. 2011-105723, filed on 10 May 2011, the contents of which are incorporated by reference herein in their entireties.

BACKGROUND

Field

The present invention relates to an electronic device including a touch panel, a control method for the electronic device, and a control program of the electronic device.

Related Art

A cellular telephone device as an example of an electronic device includes an operation unit and a display unit. The operation unit includes a plurality of numeric keys, with which a character string can be input. The display unit displays the character string thus input.

For example, some of such cellular telephone devices activate an application (a function) when a predetermined operation is performed in a state where a character is displayed on the display unit as a result of operating the numeric keys. When an application is activated, the cellular telephone device causes the application to execute processing regarding the character string displayed on the display unit (Japanese Unexamined Patent Application, Publication No. 2007-200243).

SUMMARY

When an application (a function) is activated in the mobile telephone device described above, the operation unit had to be operated to select the application. However, an application is desired to be easily activated with a small number of operations.

An object of the present invention is to provide an electronic device that easily activates a function with a small number of operations.

Another object of the present invention is to provide a control method of the electronic device, and a control program executed in the electronic device.

An electronic device of the present invention is characterized by including a display unit, a detection unit, and a control unit. The display unit displays a character string or an image. The detection unit detects contact with the display unit. In a state where a character string or an image is displayed on the display unit, in a case in which the detection unit detects contact with the character string or the image, the control unit causes at least a part of the character string or the image to be selected in accordance with such detection. The control unit activates a different function in accordance with a condition of contact when the character string or the image is selected. The control unit causes the character string or the image thus selected to be utilized in the function thus activated.

In a case in which at least a part of the character string or the image is selected in accordance with detecting contact by the detection unit, it is preferable for the control unit to activate a different function in accordance with a moving direction of the contact.

In a case in which at least a part of the character string or the image is selected in accordance with detecting contact by the detection unit, it is preferable for the control unit to activate a different function in accordance with a moving speed of the contact.

In a case in which at least a part of the character string or the image is selected in accordance with detecting contact by the detection unit, it is preferable for the control unit to activate a different function in accordance with a length of time required since selecting the character string or the image until releasing the contact with the character string or the image.

In a case in which at least a part of the character string or the image is selected in accordance with detecting contact by the detection unit, it is preferable for the control unit to activate a further different function in accordance with an area of displaying the character string or the image on the display unit where the contact was detected.

It is preferable for the control unit to activate a further different function in accordance with whether an object selected in accordance with detecting the contact by the detection unit is a character string or an image.

In a case in which at least a part of the character string is selected in accordance with detecting contact by the detection unit in a state where the character string is displayed on the display unit, it is preferable for the control unit to activate a further different function in accordance with a type of the character string thus selected.

In a case in which at least a part of the character string is selected in accordance with detecting contact by the detection unit in a state where the character string is displayed on the display unit, it is preferable for the control unit to activate a further different function in accordance with whether the character string thus selected is a numeric character string or a character string other than the numeric character string.

In a case in which at least a partial area of an image is selected in accordance with detecting contact by the detection unit in a state where the image is displayed on the display unit, it is preferable for the control unit to activate a further different function in accordance with whether the partial area is which partial area of the image thus displayed.

A control method of the present invention is characterized by including: a detecting step of detecting contact with a character string or an image displayed on a display unit; a selecting step of selecting at least a part of the character string or the image in accordance with detecting the contact with the character string or the image displayed on the display unit; and an activating step of activating a different function in accordance with a condition of contact when the character string or the image is selected, and utilizing the character string or the image thus selected in the function thus activated.

A control program of the present invention is characterized by being a control program for causing a computer to implement: a detecting step of detecting contact with a character string or an image displayed on a display unit; a selecting step of selecting at least a part of the character string or the image in accordance with detecting the contact with the character string or the image displayed on the display unit; and an activating step of activating a different function in accordance with a condition of contact when the character string or the image is selected, and utilizing the character string or the image thus selected in the function thus activated.

According to the present invention, it is possible to easily activate a function with a small number of operations.

BRIEF DESCRIPTION

Figure 3:
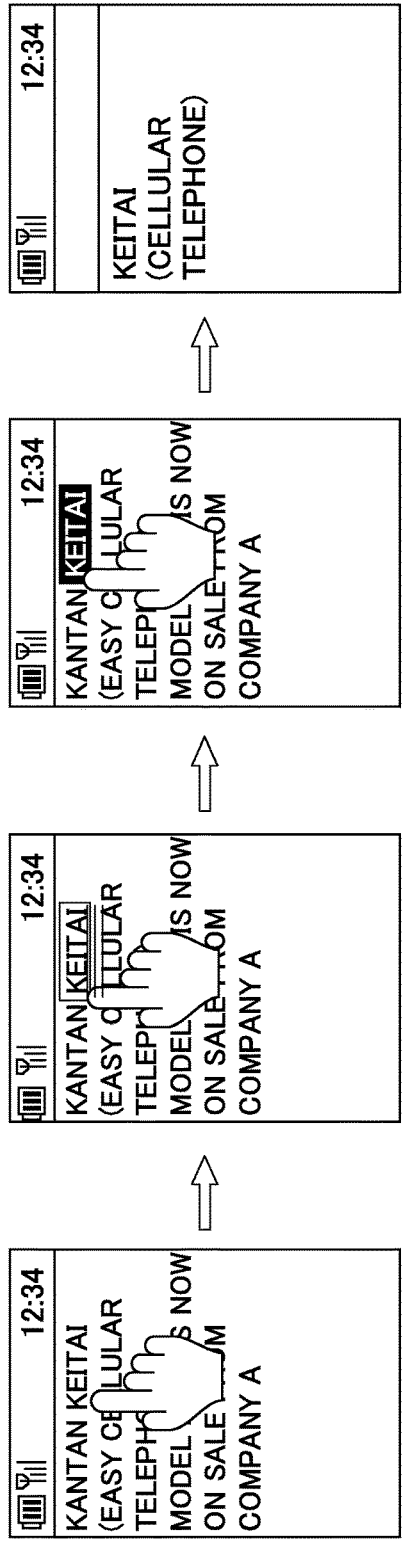
Figure 4:
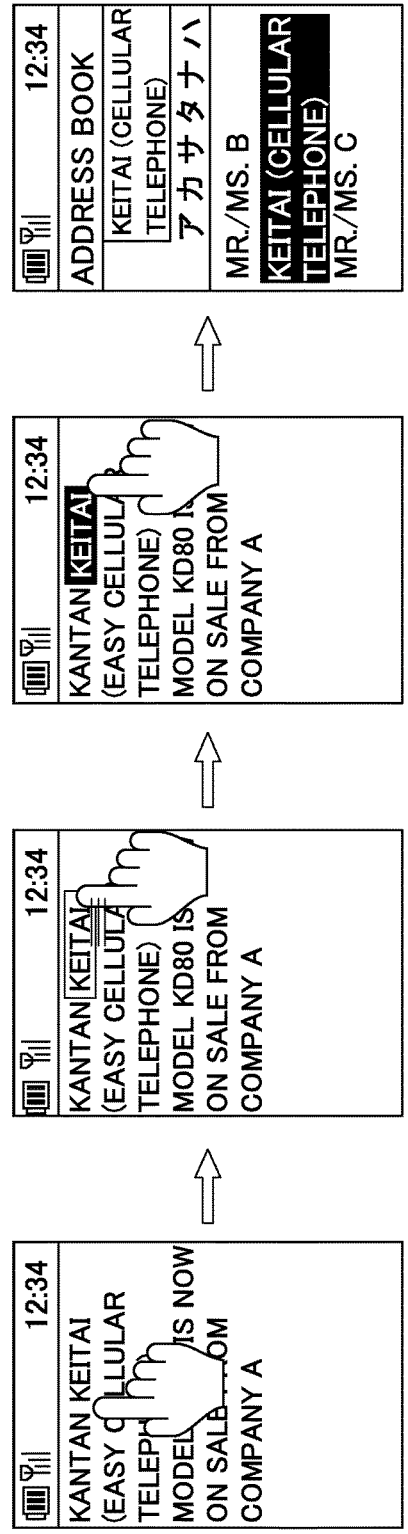
Figure 5:
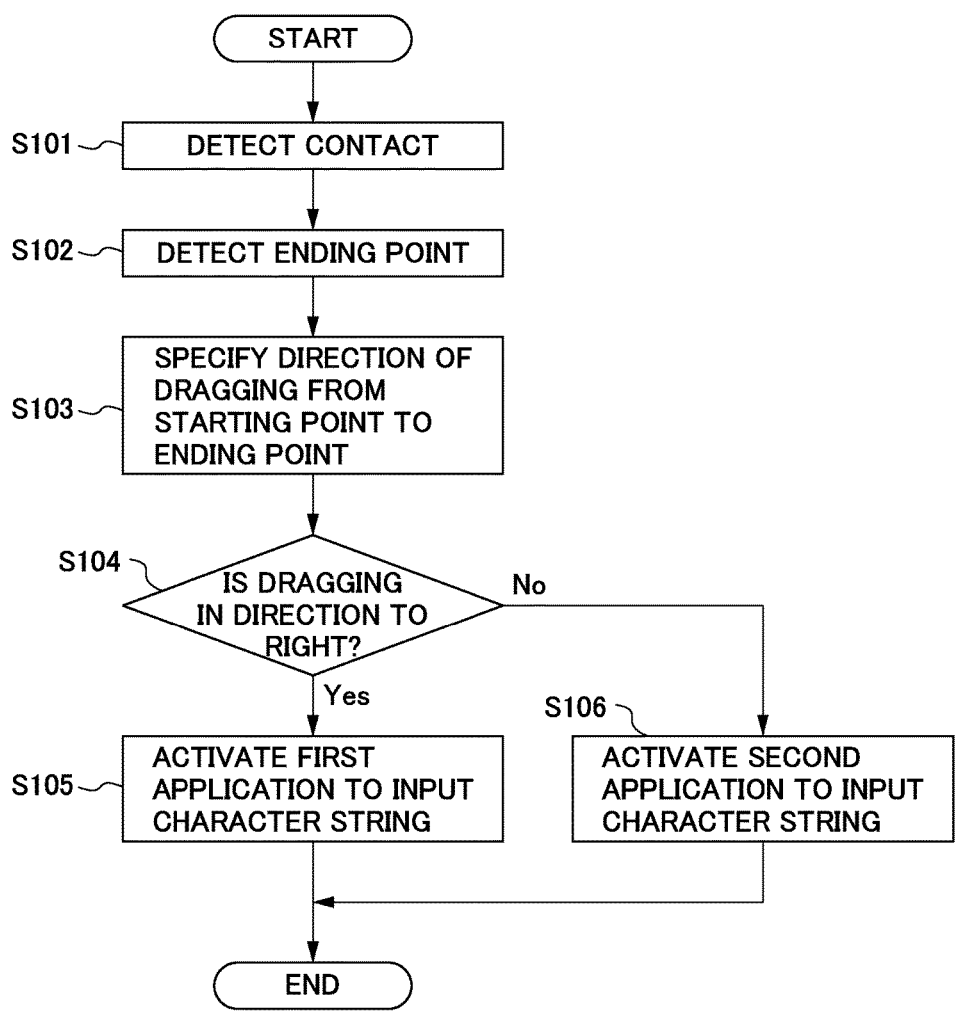
Figure 12:
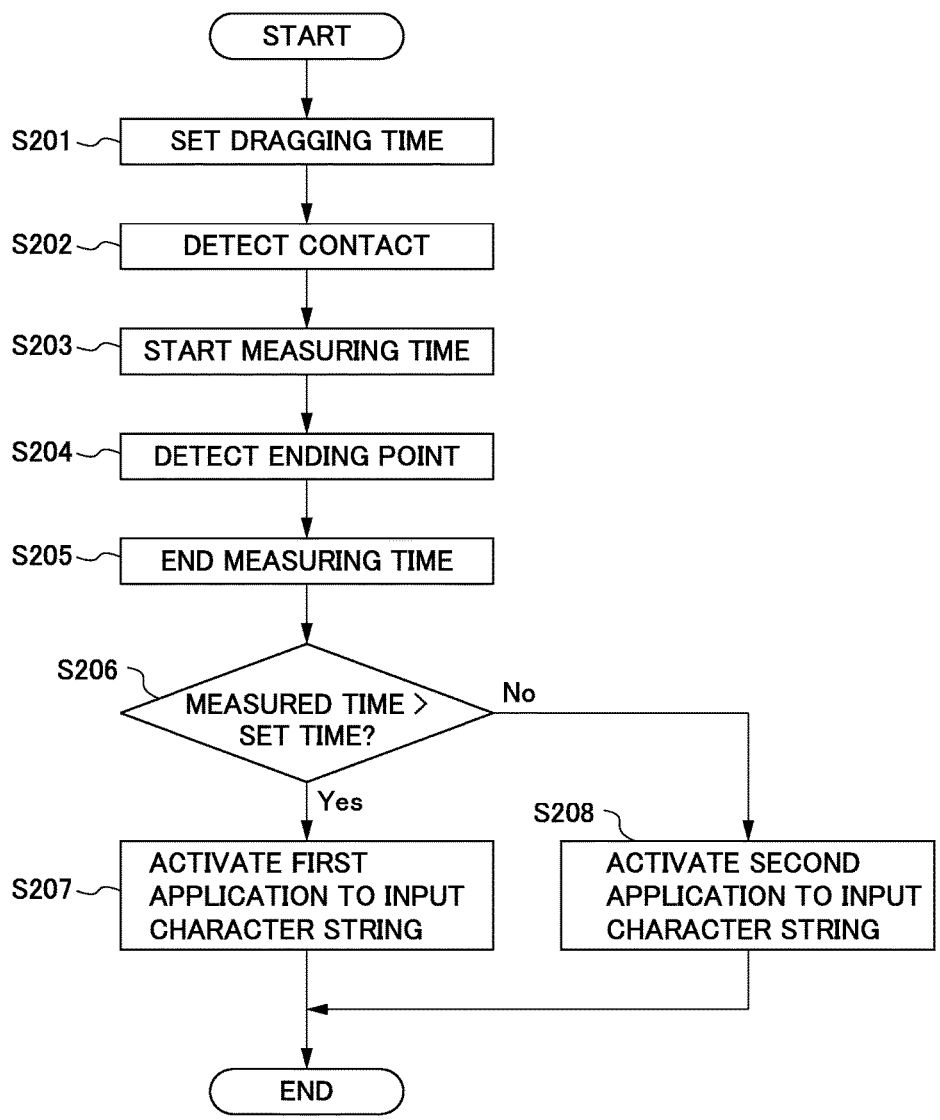
Figure 13A:
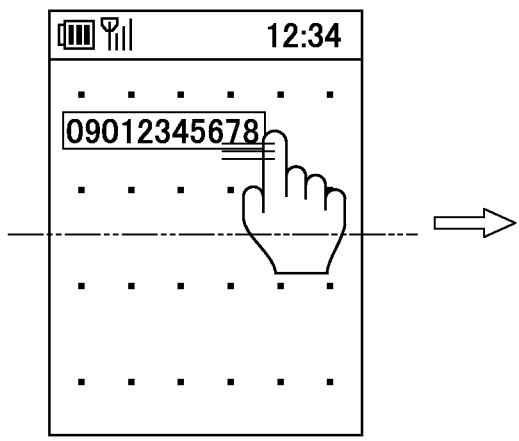
Figure 13B:
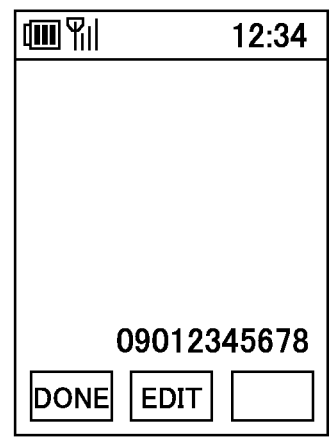
Figure 14A:
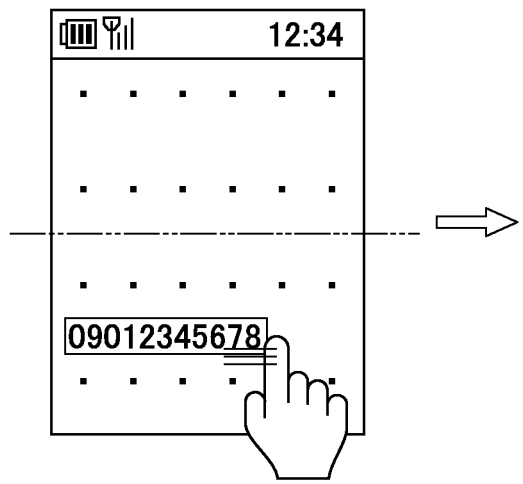
Figure 14B:
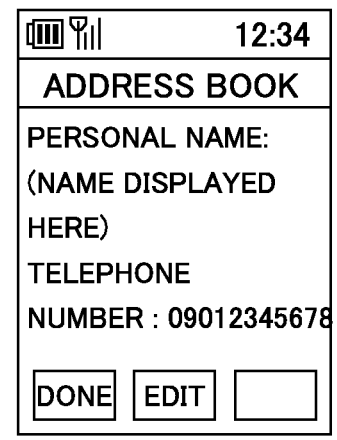
Figure 15:
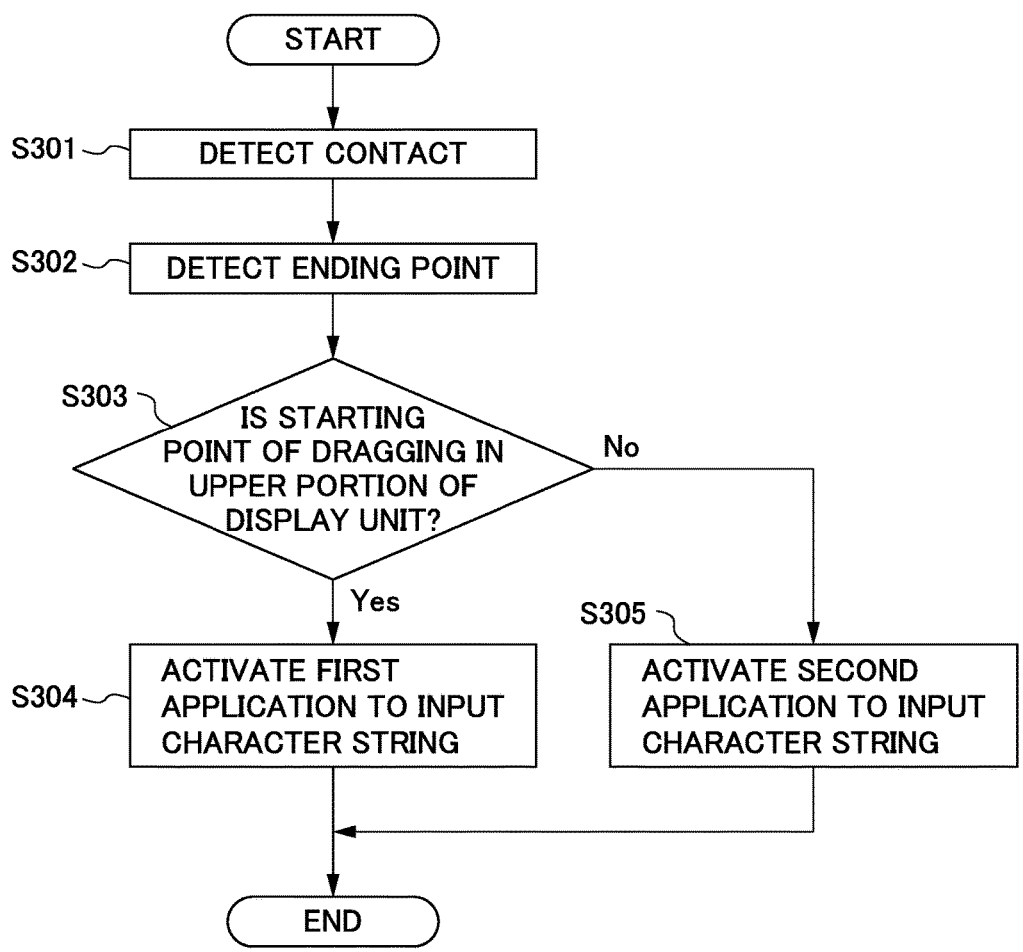

FIGS. 3 A-D represent a first transition diagram showing a screen displayed on a touch panel;

FIGS. 4 A-D represent a second transition diagram showing a screen displayed on the touch panel;

FIG. 5 is a flowchart illustrating operations of a first specific example;

FIGS. 6 A-B represent a third transition diagram showing a screen displayed on the touch panel;

FIGS. 7 A-B represent a fourth transition diagram showing a screen displayed on the touch panel;

FIGS. 8 A-D represent a fifth transition diagram showing a screen displayed on the touch panel;

FIGS. 9 A-B represent a sixth transition diagram showing a screen displayed on the touch panel;

FIGS. 10 A-D represent a seventh transition diagram showing a screen displayed on the touch panel;

FIGS. 11 A-D represent an eighth transition diagram showing a screen displayed on the touch panel;

FIG. 12 is a flowchart illustrating operations of a third specific example;

FIGS. 13 A-B represent a ninth transition diagram showing a screen displayed on the touch panel;

FIGS. 14 A-B represent a tenth transition diagram showing a screen displayed on the touch panel;

FIG. 15 is a flowchart illustrating operations of a fifth specific example; and

Figure 16A:
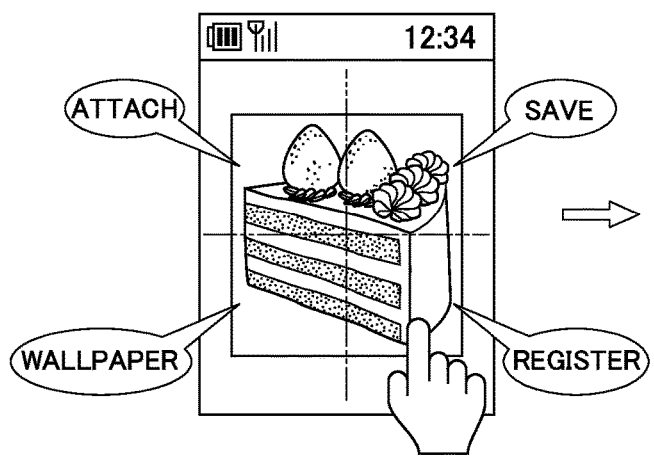
Figure 16B:
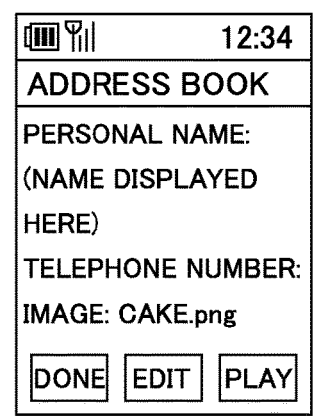

FIGS. 16 A-B represent an eleventh transition diagram showing a screen displayed on the touch panel.

DETAILED DESCRIPTION

Figure 1:
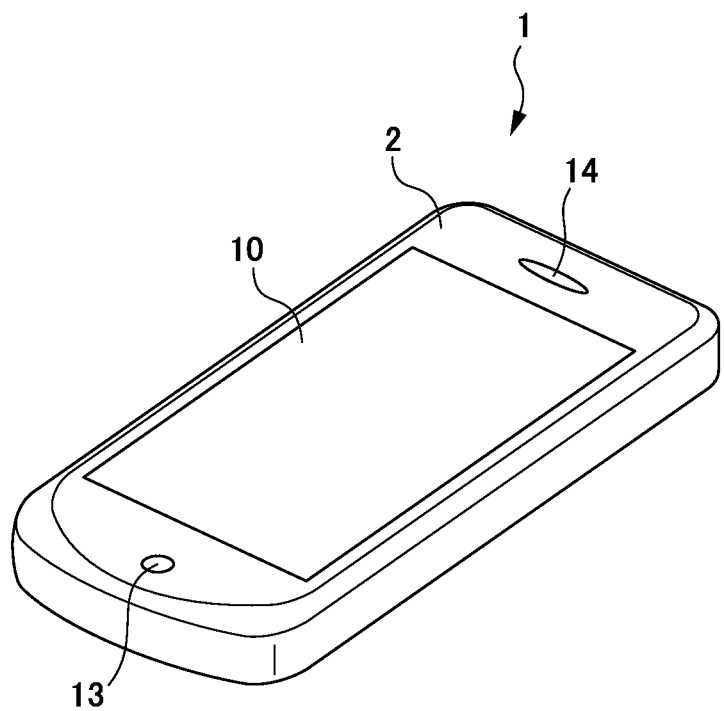
FIG. 1 is a perspective view showing an appearance of a mobile telephone device according to an embodiment of the present invention.

Descriptions are provided hereinafter regarding an embodiment of the present invention. First of all, with reference to FIG. 1, descriptions are provided for a basic structure of a mobile telephone device 1 according to an embodiment of the electronic device of the present invention. FIG. 1 is a perspective view showing an appearance of the mobile telephone device 1 according to an embodiment of the present invention;

The mobile telephone device 1 includes a body 2. A touch panel 10, a microphone 13 and a receiver 14 are disposed on a front face of the body 2.

Figure 2:
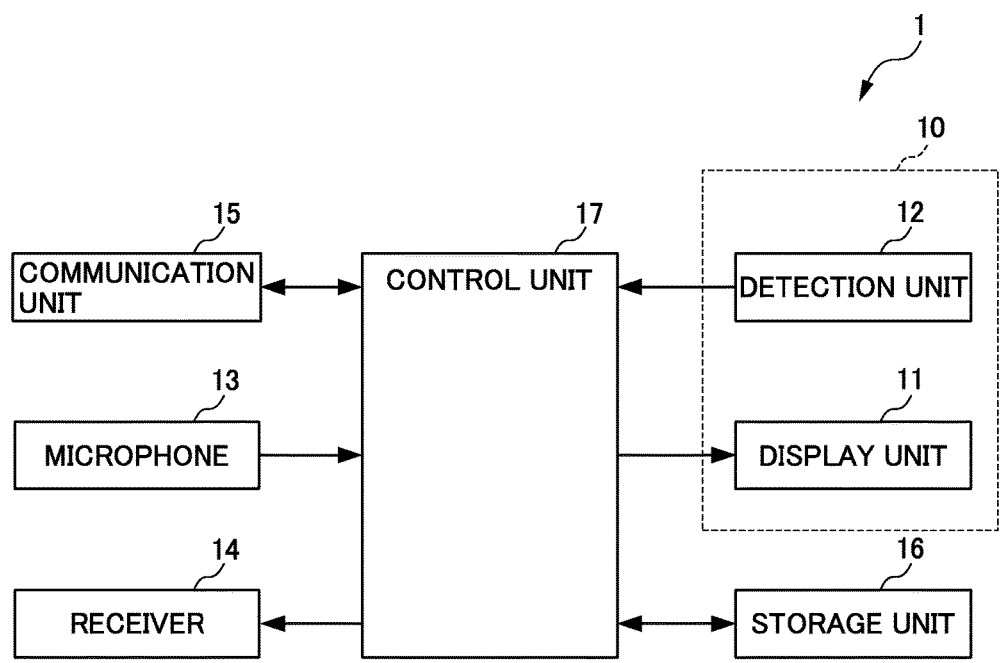
FIG. 2 is a block diagram showing a functional configuration of the mobile telephone device.

The touch panel 10 includes a display unit 11 and a detection unit 12 (see FIG. 2). The display unit 11 is composed of liquid crystals or organic electroluminescence elements. The detection unit 12 detects a touch by an object, such as a finger or stylus of a user of the mobile telephone device 1, on the display unit 11. The detection unit 12 is correspondingly disposed on a surface of the display unit 11. For example, a capacitive sensing method, a resistive film method or the like can be utilized in the detection unit 12.

The microphone 13 is used for inputting sound produced by the user of the mobile telephone device 1 during a telephone call.

The receiver 14 is used for outputting sound produced by the other party whom the user of the mobile telephone device 1 is talking with.

Next, a functional configuration of the mobile telephone device 1 is described with reference to FIG. 2. FIG. 2 is a block diagram showing the functional configuration of the mobile telephone device 1.

The mobile telephone device 1 includes the touch panel 10 (the display unit 11 and the detection unit 12), the microphone 13 and the receiver 14, as described above. The mobile telephone device 1 includes a communication unit 15, a storage unit 16, and a control unit 17.

The communication unit 15 includes a main antenna (not shown), an RF circuit unit (not shown) and the like. The communication unit 15 performs communication with an external device such a base station via a predetermined usable frequency band.

More specifically, the communication unit 15 executes demodulation processing on a signal received via the main antenna. The communication unit 15 transmits the signal thus processed to the control unit 17.

The communication unit 15 executes modulation processing on a signal transmitted from the control unit 17. The communication unit 15 transmits the signal thus processed to the external device (the base station) via the main antenna.

The storage unit 16 includes, for example, working memory. The storage unit 16 is utilized for arithmetic processing by the control unit 17. The storage unit 16 stores applications or databases that are operated inside the mobile telephone device 1. The storage unit 16 may also serve as detachable external memory.

The control unit 17 controls the entirety of the mobile telephone device 1, and performs control of the display unit 11 and the communication unit 15.

The mobile telephone device 1 with such a configuration has a function of easily activating an application with a small number of operations. Descriptions are hereinafter provided for a configuration and operations for achieving the aforementioned function according to the mobile telephone device 1.

The display unit 11 displays a character string or an image. A character string is composed of at least one of a hiragana character, a katakana character, a kanji character, an alphabetic character, a numeric character, a symbol and a pictogram. A character string may be composed of a single character, and may also be composed of a plurality of characters. A character string and an image are displayed on the display unit 11, as a result of receiving mail via the communication unit 15, or browsing a web site. A character string may be displayed on the display unit 11, as a result of operating a character input key as a soft key disposed on the display unit 11. An image is displayed on the display unit 11, as a result of taking a picture of a subject by utilizing a camera unit (not shown). An image may be a static image, and may also be a moving image. A character string and an image may be displayed on the display unit 11 with any method other than the methods described above.

In a state where a character string or an image is displayed on the display unit 11, in a case in which the detection unit 12 detects contact with the character string or the image, the control unit 17 executes processing as follows. More specifically, the control unit 17 causes at least a part of the character string or the image to be selected in accordance with detecting the contact. The control unit 17 activates a different function in accordance with a condition of contact with the character string or the image when the character string or the image is selected. The control unit 17 causes the character string or the image thus selected to be utilized in the function thus activated.

Selecting at least a part of a character string means sweeping the part of the character string displayed on the display unit 11 with a finger or the like, thereby selecting the character string thus swept with the finger or the like. Selecting at least a part of an image means touching the part of the image displayed on the display unit 11 with a finger or the like, thereby selecting the image thus touched with the finger or the like.

The control unit 17 activates a different function in accordance with a condition of contact when the character string or the image is selected. A condition of contact is a situation of sweeping the touch panel 10 with a finger or the like in a direction from right to left or from left to right, a situation of touching the touch panel 10 with a finger or the like at a constant speed, and a situation of continuously touching the touch panel 10 with a finger or the like for certain duration.

The control unit 17 may determine a manner of selecting a character string or an image in accordance with the condition of contact with the character string or the image. The control unit 17 activates a different function in accordance with the manner of selecting the character string or the image. The control unit 17 may cause the character string or the image thus selected to be utilized in the function thus activated. The control unit 17 determines a manner of selecting a character string or an image in accordance with a condition of contact such as, for example, sweeping the character string or the image displayed on the display unit 11 with a finger or the like in the direction from right to left or from left to right. The control unit 17 determines a manner of selecting a character string or an image in accordance with a condition of contact such as sweeping the character string or the image displayed on the display unit 11 with a finger or the like at a speed of at least a predetermined value or at a speed under the predetermined value. The control unit 17 determines a manner of selecting a character string or an image, in accordance with a condition of contact after sweeping the character string or the image displayed on the display unit 11 with a finger or the like, such as quitting the sweeping after a predetermined period of time has elapsed, or quitting the sweeping before the predetermined period of time has elapsed. The manners of selecting a character string or an image are not limited to the examples described above.

Activating a different function means, for example, changing an application to be activated. Specific examples of activating a different function include activating a mail application, activating an address book application, activating a web application, or the like, in accordance with a manner of selection.

Causing a selected character string to be utilized means, for example, causing the selected character string to be input into a character input area of the mail application, the address book application or the web application, and to be displayed on the display unit 11. Causing a selected image to be utilized means, for example, attaching the selected image to the mail application, or registering the selected image with the address book.

The mobile telephone device 1, which includes the display unit 11, the control unit 17 and the like, performs a detecting step, a selecting step, and an activating step. In the detecting step, contact with a character string or an image displayed on the display unit 11 is detected by utilizing the detection unit 12. In the selecting step, at least a part of the character string or the image displayed on the display unit 11 is selected in accordance with detecting the contact with the character string or the image. In the activating step, a different function is activated in accordance with a condition of contact when the character string or the image is selected. In the activating step, the character string or the image thus selected is caused to be utilized in the function thus activated. The mobile telephone device 1 includes a program for causing the control unit 17 and the like to execute the steps (operations) described above. Such a mobile telephone device 1 can easily activate a function with a small number of operations.

It is preferable for the control unit 17 to activate a further different function in accordance with whether an object selected in accordance with detecting the contact by the detection unit 12 is a character string or an image. In a case in which a character string is selected, the control unit 17 activates a function capable of inputting the character string thus selected (for example, a mail function (the mail application), a web function (the web application), a text function (a text application)). In a case in which an image is selected, the control unit 17 activates a function capable of registering the image thus selected (for example, the mail function (the mail application) and the like). As a result, the mobile telephone device 1 can activate a function in accordance with a character string or an image.

In a case in which at least a part of a character string is selected in accordance with detecting contact by the detection unit 12 in a state where the character string is displayed on the display unit 11, it is preferable for the control unit 17 to execute processing as follows. More specifically, it is preferable for the control unit 17 to activate a further different function in accordance with a type of the character string thus selected. For example, in a case in which the selected character string is composed of numeric characters only, the control unit 17 activates a telephone function (telephone application). The control unit 17 sets the selected character string (the numeric characters) as a telephone number. In a case in which the selected character string is composed of alphabetic characters only, or in a case in which the selected character string is composed of alphabetic characters and numeric characters, or in a case in which the selected character string is composed of alphabetic characters and symbols (colon (:), slash (/) or period (.)), the control unit 17 activates the web function (the web application). The control unit 17 sets the selected character string as a URL (Uniform Resource Locator). As a result, the mobile telephone device 1 can activate a function in accordance with a type of characters composing a character string.

Next, specific examples are described. First of all, a first specific example is described. FIGS. 3 A-D represent a first transition diagram showing a screen displayed on the touch panel 10. FIGS. 4 A-D represent a second transition diagram showing a screen displayed on the touch panel 10.

In a case in which at least a part of a character string or an image is selected in accordance with detecting contact by the detection unit 12, it is preferable for the control unit 17 to activate a different function in accordance with a moving direction of the contact.

For example, an example is described for a case in which a character string "Kantan Keitai (easy mobile telephone) model KD80 is now on sale from a company A" is displayed on the touch panel 10 (the display unit 11) (see FIG. 3A). In this case, when a character string that is desired to be selected is swept with a finger in the direction from right to left (see FIG. 3B), thereby selecting a katakana character string "Keitai (mobile telephone)" (see FIG. 3C), then the control unit 17 executes processing as follows. More specifically, the control unit 17 activates the text function (the text application), in which the selected katakana character string "Keitai" is input into a character input area. The control unit 17 causes the display unit 11 to perform displaying (see FIG. 3D).

On the other hand, in a case in which the character string "Kantan Keitai (easy mobile telephone) model KD80 is now on sale from a company A" is displayed on the touch panel 10 (the display unit 11) (see FIG. 4A), when a character string that is desired to be selected is swept with the finger in the direction from left to right (see FIG. 4B), thereby selecting the katakana character string "Keitai (mobile telephone)" (see FIG. 4C), then the control unit 17 executes processing as follows. More specifically, the control unit 17 activates the address book function (the address book application), in which the selected katakana character string "Keitai" is input into the character input area. The control unit 17 causes the display unit 11 to perform displaying (see FIG. 4D).

Here, the control unit 17 may activate a different function in accordance with whether the direction is a forward direction or a reverse direction in terms of the direction of the character string displayed on the display unit 11.

Functions to be activated are set in advance. Therefore, the functions to be activated are not limited to the examples described above.

In consideration of a case in which a wrong range was selected with a finger, the control unit 17 can cancel the selection of the character string when returning from a screen for an activated function to a screen for selecting a character string.

Next, operations of the first specific example are described. FIG. 5 is a flowchart illustrating the operations of the first specific example.

In Step S101, based on a result of detection by the detection unit 12, the control unit 17 detects that a contact object such as a finger or a stylus touches the touch panel 10 (the display unit 11).

In Step S102, based on a result of detection by the detection unit 12, the control unit 17 detects an ending point of sweeping by the contact object on the touch panel 10. The control unit 17 may detect an ending point when the contact is released. The control unit 17 may detect an ending point when the contact is detected at the same position for predetermined duration.

In Step S103, based on the result of detection in Step S101 and the result of detection in Step S102, the control unit 17 identifies a moving direction (a dragging direction) of the contact object that touched the touch panel 10. The control unit 17 identifies a character string or an image that was selected, based on the result of detection in Step S101, the result of detection in Step S102, and position information about a character string or an image displayed on the touch panel 10.

In Step S104, the control unit 17 determines whether the dragging direction identified by the processing in Step S103 is a right direction (movement in the direction from left to right). In a case in which the dragging direction is the direction to the right (YES), the processing advances to Step S105. In a case in which the dragging direction is not the direction to the right (NO), the processing advances to Step S106.

In Step S105, the control unit 17 activates the first application (the first function) associated with dragging in the direction to the right. The control unit 17 causes a character string to be input into a character input area, or causes an image to be input into an image input area. The control unit 17 causes the display unit 11 to perform displaying. The control unit 17 may automatically activate the first application (the first function) upon detecting an ending point.

In Step S106, the control unit 17 activates a second application (a second function) associated with dragging in a direction to the left, the second application being different from the first application. The control unit 17 causes a character string to be input into a character input area, or causes an image to be input into an image input area. The control unit 17 causes the display unit 11 to perform displaying. The control unit 17 may automatically activate the second application (the second function) upon detecting an ending point. Here, the control unit 17 may activate a different function in accordance with whether the direction is a forward direction or a reverse direction in terms of the direction of the character string displayed on the display unit 11.

As a result, the mobile telephone device 1 can easily select an application to be activated, simply by changing the direction of sweeping with a finger or the like. The mobile telephone device 1 can easily activate an application with a small number of operations.

Figure 6A:
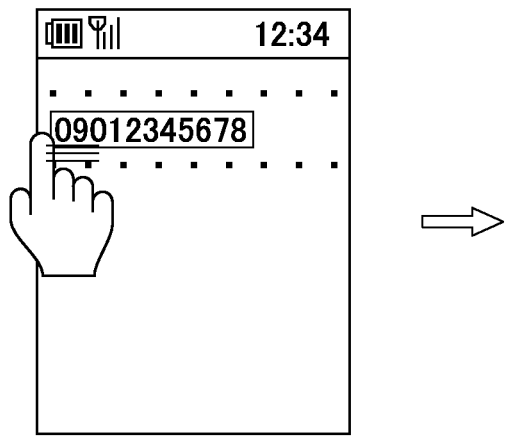
Figure 6B:
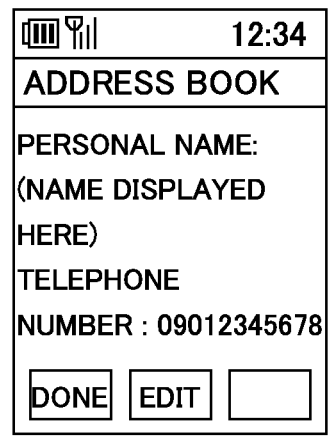
Figure 8A:
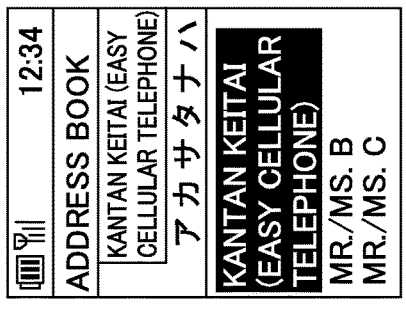
Figure 8B:
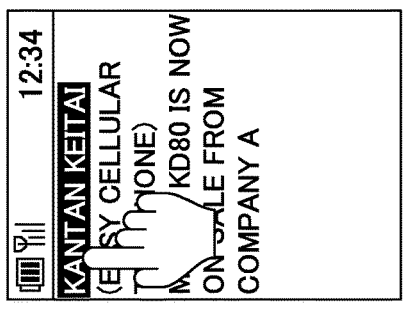
Figure 8C:
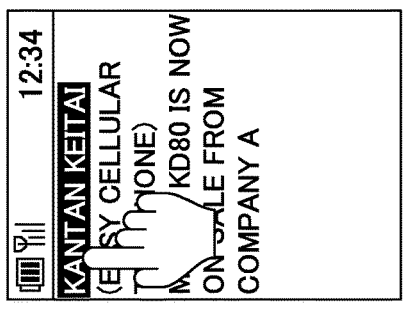
Figure 8D:
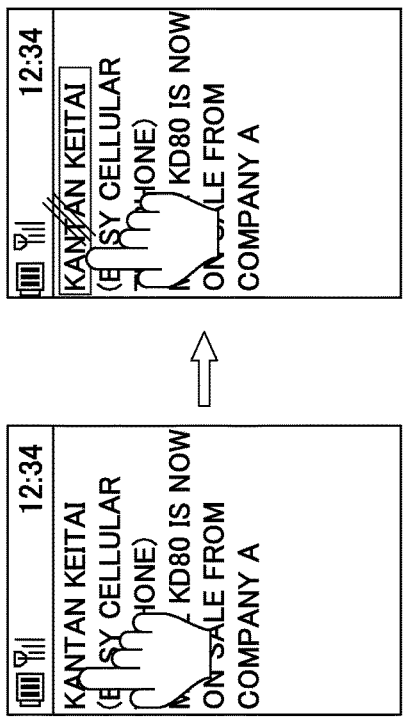

FIGS. 6 A-B represent a third transition diagram showing a screen displayed on the touch panel 10. FIGS. 7 A-B represent a fourth transition diagram showing a screen displayed on the touch panel 10. For example, in a case in which a character string composed of only numeric characters is selected by sweeping the touch panel 10 (display unit 11) with the finger in the direction from right to left (see FIG. 6A), the control unit 17 activates the address book function (the address book application). The control unit 17 causes the character string thus selected to be input into a telephone number input area of the address book function (the address book application) thus activated. The control unit 17 causes the display unit 11 to perform displaying (see FIG. 6B). On the other hand, in a case in which a character string composed of only numeric characters is selected by sweeping the touch panel 10 (display unit 11) with the finger in the direction from left to right (see FIG. 7A), the control unit 17 activates the telephone function (the telephone application). In the telephone function (telephone application) thus activated, the control unit 17 causes the display unit 11 to display the character string as a telephone number for an outgoing call (see FIG. 7B). The control unit 17 may subsequently automatically make an outgoing call to the character string thus displayed.

FIGS. 8 A-D represent a fifth transition diagram showing a screen displayed on the touch panel 10. In a case in which a character string is composed of a plurality of lines, the control unit 17 may allow the character string to be swept with a finger or the like in a direction from top to bottom on the display unit 11, or may allow the character string to be swept with a finger or the like in a direction from bottom to top on the display unit 11. In this case as well, the control unit 17 activates a different function in accordance with the moving direction of a finger or the like. For example, an example is described for a case in which a character string "Kantan Keitai (easy mobile telephone) is now on sale from a company A" is displayed in a plurality of lines on the touch panel 10 (the display unit 11) (see FIG. 8A). In this case, when the character string is swept (dragged) with a finger starting from a character "ka" in the head of the character string "Kantan" displayed in the first line toward a character "i" in the tail of the character string "Keitai" displayed in the second line (in a direction from an upper portion toward a lower portion of the touch panel 10) (see FIG. 8B), the control unit 17 recognizes that the character string "Kantan Keitai" ranging from the character "ka" to the character "i" was selected (see FIG. 8C). The control unit 17 activates the address book function associated with the moving direction of a finger (here, the direction from top to bottom). The control unit 17 causes the selected character string "Kantan Keitai" to be input into the character input area of the address book function. Subsequently, the control unit 17 causes the display unit 11 to perform displaying (see FIG. 8D).

Figure 9A:
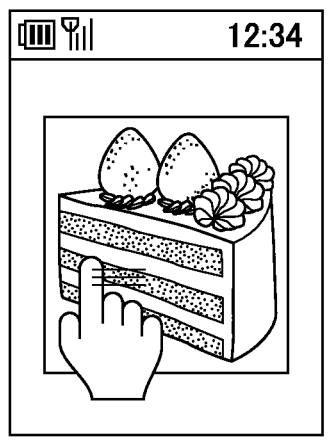
Figure 9B:
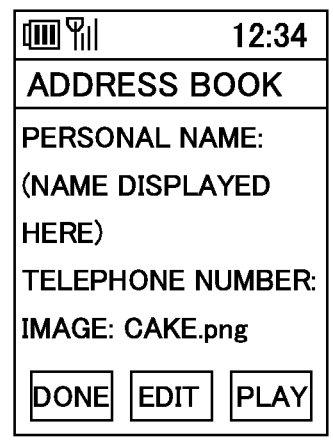

FIGS. 9 A-B represent a sixth transition diagram showing a screen displayed on the touch panel 10. Not only in a case in which a character string is selected, but also in a case in which at least a part of an image is selected, the control unit 17 can activate a different function in accordance with a moving direction of the contact with the image. For example, in a case in which an image is displayed on the touch panel 10 (the display unit 11), when the image is swept (selected) with a finger in the direction from right to left, the control unit 17 executes processing as follows (see FIG. 9A). More specifically, the control unit 17 activates the address book function associated with the moving direction of a finger. The control unit 17 registers the selected image with the address book (see FIG. 9B).

In a case in which a plurality of images are displayed on the touch panel 10 (the display unit 11), when at least one of the images is selected by being touched with a finger or the like (or being swept with a finger or the like), the control unit 17 executes a function as follows. More specifically, the control unit 17 executes a function in accordance with a moving direction of contact with the image thus selected.

The control unit 17 can calculate an average gray value of the image within a range that was swept with a finger (a moving range of the contact), and can activate a different function in accordance with whether the average gray value thus calculated is higher or lower than an average gray value of the image displayed on the touch panel 10.

The control unit 17 can also identify an object such as a person depicted in the image, and activate a function in accordance with a contour of the object when the contour is touched.

FIGS. 10 A-D represent a seventh transition diagram showing a screen displayed on the touch panel 10. In a case in which a plurality of at least parts of a character string or an image are selected, the control unit 17 can activate a different function in accordance with a moving direction of the contact. For example, an example is described for a case in which character strings "1. Company A", "2. Company B", "3. Company C", "A. mobile phone" and "B. PHS" are displayed on the touch panel 10 (the display unit 11) (see FIG. 10A). In this case, first of all, "Company A" is selected by sweeping the touch panel 10 (the display unit 11) with a finger (see FIG. 10B). Next, "PHS" is selected by sweeping the touch panel 10 with the finger again within a predetermined period of time after detaching the finger or the like from the touch panel 10 once (see FIG. 10C). At this time, the control unit 17 activates the web function, and executes a web search by using "Company A" and "PHS" as search words (see FIG. 10D).

The control unit 17 may activate a different function in accordance with a moving direction of initial contact (sweeping "Company A" in the above example). The control unit 17 may activate a different function in accordance with a moving direction of final contact (sweeping "PHS" in the above example). The control unit 17 may activate a different function in accordance with a direction of movement, in a case in which all of the contact (sweeping "Company A" and "PHS" in the above example) move in the same direction.

The control unit 17 can activate a predetermined function, in a case in which a plurality of character strings are selected at the same time (when "Company A" and "PHS" are swept at the same time in the above example).

Next, a second specific example is described. FIGS. 11 A-D represent an eighth transition diagram showing a screen displayed on the touch panel 10.

In a case in which at least a part of a character string or an image is selected in accordance with detecting contact by the detection unit 12, it is preferable for the control unit 17 to activate a different function in accordance with a moving speed of the contact with the character string or the image. For example, a threshold value is set in advance in the control unit 17. When the touch panel 10 is swept with a finger to select a character string displayed on the touch panel 10 (the display unit 11), in a case in which a sweeping speed per character on the touch panel 10 is at least the threshold value, the control unit 17 activates the first function (the first application). On the other hand, in a case in which a sweeping speed per character on the touch panel 10 is below the threshold value, the control unit 17 activates the second function (the second application) different from the first function.

As a specific example, descriptions are provided for a case in which a character string " . . . 09012315678 . . . " is displayed on the touch panel 10 (the display unit 11) (see FIG. 11A). In this case, when the character string "09012315678" is swept with a finger in the direction from left to right (see FIG. 11B), in a case in which the moving speed of the finger per character is at least the threshold value, the control unit 17 activates the address book function (the address book application). The control unit 17 causes the character string "09012315678" thus selected to be input into the character input area of the address book application thus activated. The control unit 17 causes the touch panel 10 to perform displaying (see FIG. 11C).

On the other hand, in a state where the character string " . . . 09012315678 . . . " is displayed on the touch panel 10 (the display unit 11) (see FIG. 11A), when the character string "09012315678" is swept with a finger in the direction from left to right (see FIG. 11B), in a case in which the moving speed of the finger per character is below the threshold value, the control unit 17 activates the telephone function (the telephone application). The control unit 17 causes the touch panel 10 to display the selected character string "09012315678" as a telephone number for an outgoing call (see FIG. 11D). The control unit 17 may subsequently automatically make an outgoing call to the character string thus displayed.

The direction of sweeping with a finger (the moving direction of contact) is not limited to the example described above, and may be the direction from right to left. In a case in which a character string is composed of a plurality of lines, the direction of sweeping with a finger may be a vertical direction.

A plurality of character strings or images may be selected.

A plurality of threshold values can be set. In this case, the control unit 17 activates any one of three or more functions in accordance with a moving speed.

As a result, the mobile telephone device 1 can easily select an application to be activated, simply by changing a speed of sweeping with a finger or the like. The mobile telephone device 1 can easily activate an application with a small number of operations.

Next, a third specific example is described. In a case in which at least a part of a character string or an image is selected in accordance with detecting contact by the detection unit 12, it is preferable for the control unit 17 to activate a different function in accordance with traveling time of the contact with the character string or the image. For example, a threshold value is set in advance in the control unit 17. When a finger is touched on the touch panel 10 to select a character string displayed on the touch panel 10 (the display unit 11), in a case in which duration from touching the finger on the touch panel 10 until detaching the finger from the touch panel 10 is greater than the threshold value, the control unit 17 activates the first function (the first application). On the other hand, in a case in which the duration from touching the finger on the touch panel 10 until detaching the finger from the touch panel 10 is smaller than the threshold value, the control unit 17 activates the second function (the second application) different from the first function.

FIG. 12 is a flowchart illustrating the operations of the third specific example.

In Step S201, dragging time as the aforementioned threshold value is set in the control unit 17.

In Step S202, based on a result of detection by the detection unit 12, the control unit 17 detects that a contact object such as a finger or a stylus touches the touch panel 10 (the display unit 11).

In Step S203, a timer (not shown) starts timing when the contact of the contact object was detected in Step S202, In Step S204, based on a result of detection by the detection unit 12, the control unit 17 detects an ending point of sweeping by the contact object on the touch panel 10. The control unit 17 may detect an ending point when the contact is released. The control unit 17 may detect an ending point when the contact is detected at the same position for predetermined duration.

In Step S205, the timer terminates the timing when the ending point of the contact was detected in Step S204.

In Step S206, the control unit 17 obtains traveling time (measured time) of the contact object, based on initiation of the timing by the processing in Step S203, and termination of the timing by the processing in Step S205. The control unit 17 determines whether the measured time thus obtained is longer than the dragging time (set time) that was set in Step S201. In a case in which the measured time is longer than the set time (YES), the processing advances to Step S207. In a case in which the measured time is shorter than the set time (NO), the processing advances to Step S208.

In Step S207, the control unit 17 activates the first application (the first function). The control unit 17 causes a character string to be input into a character input area, or causes an image to be input into an image input area, and causes the display unit 11 to perform displaying. The control unit 17 may automatically activate the first application (the first function) upon detecting an ending point.

In Step S208, the control unit 17 activates the second application (the second function) different from the first application. The control unit 17 causes a character string to be input into a character input area, or causes an image to be input into an image input area, and causes the display unit 11 to perform displaying. The control unit 17 may automatically activate the second application (the second function) upon detecting an ending point.

A plurality of threshold values can be set. In this case, the control unit 17 activates any one of three or more functions in accordance with traveling time.

A plurality of character strings or images can be selected.

As a result, the mobile telephone device 1 can easily select an application to be activated, simply by changing duration of sweeping with a finger or the like. The mobile telephone device 1 can easily activate an application with a small number of operations.

Next, a fourth specific example is described. In a case in which at least a part of a character string or an image is selected in accordance with detecting contact by the detection unit 12, it is preferable for the control unit 17 to activate a different function in accordance with a length of time required since selecting the character string or the image until releasing the contact with the character string or the image.

For example, in a case in which the touch panel 10 (the display unit 11) is swept with a finger to select a character string or an image, the control unit 17 determines whether the duration from terminating the sweeping on the touch panel 10 until detaching the finger from the touch panel 10 is at least a preset threshold value. In a case in which the duration is at least the threshold value, the control unit 17 activates the first function (the first application). On the other hand, in a case in which the duration is below the threshold value, the control unit 17 activates the second function (the second application) different from the first function.

More specifically, based on a result of detection by the detection unit 12, the control unit 17 detects that a contact object such as a finger or a stylus touches the touch panel 10 (the display unit 11), and thereafter detects movement of the contact object; furthermore, when the control unit 17 detects that the movement of the contact object ceased, the control unit 17 causes the timer (not shown) to start timing. When the control unit 17 detects that the contact object is detached from the touch panel 10 based on a result of detection by the detection unit 12, the control unit 17 causes the timer to stop the timing. The control unit 17 determines whether the duration (the measured time) measured by the timer is at least the threshold value. In a case in which the measured time is at least the threshold value, the control unit 17 activates the first function. In a case in which the measured time is below the threshold value, the control unit 17 activates the second function.

A plurality of threshold values can be set. In this case, the control unit 17 activates any one of three or more functions in accordance with measured time.

A plurality of character strings or images can be selected.

As a result, the mobile telephone device 1 can easily select an application to be activated, simply by changing duration of touching the touch panel 10. The mobile telephone device 1 can easily activate an application with a small number of operations.

Next, a fifth specific example is described. FIGS. 13 A-B represent a ninth transition diagram showing a screen displayed on the touch panel 10. FIGS. 14 A-B represent a tenth transition diagram showing a screen displayed on the touch panel 10.

In a case in which at least a part of a character string or an image is selected in accordance with detecting contact by the detection unit 12, it is preferable for the control unit 17 to activate a further different function in accordance with an area of displaying the character string or the image on the display unit 11 where the contact was detected.

In the fifth specific example, a length of the character string to be selected exceeds a text length that can be concurrently displayed on the display unit 11. More specifically, the character string to be selected is sequentially displayed on the display unit 11 by scrolling the screen. In this case, the screen displayed on the display unit 11 is vertically divided into two areas (an upper screen area and a lower screen area), and in a case in which a character string displayed in any one of the areas is selected, the control unit 17 activates a different function in accordance with the area where the selected character string is displayed.

For example, in a case in which a character string "09012345678" displayed in the upper screen area is selected by being swept with a finger in the direction from left to right (see FIG. 13A), the control unit 17 executes processing as follows. More specifically, the control unit 17 activates the telephone function (the telephone application) associated with the upper screen area. The control unit 17 sets the selected character string as a telephone number for an outgoing call (see FIG. 13B). On the other hand, in a case in which a character string "09012345678" displayed in the lower screen area is selected by being swept with a finger in the direction from left to right (see FIG. 14A), the control unit 17 executes processing as follows. More specifically, the control unit 17 activates the address book function (the address book application) associated with the lower screen area. The control unit 17 causes the selected character string to be input into the character input area, and causes the display unit 11 to perform displaying (see FIG. 14B).

The direction of sweeping with a finger (the moving direction of contact) is not limited to the example described above, and may be the direction from right to left. In a case in which a character string composed of a plurality of lines is selected, the direction of sweeping with a finger may be a vertical direction. Moreover, a plurality of character strings or images may be selected.

Next, operations of the fifth specific example are described. FIG. 15 is a flowchart illustrating the operations of the fifth specific example.

In Step S301, based on a result of detection by the detection unit 12, the control unit 17 detects that a contact object such as a finger or a stylus touches the touch panel 10 (the display unit 11).

In Step S302, based on a result of detection by the detection unit 12, the control unit 17 detects an ending point of sweeping (dragging) by the contact object on the touch panel 10. The control unit 17 may detect an ending point when the contact is released. The control unit 17 may detect an ending point when the contact is detected at the same position for predetermined duration.

In Step S303, the control unit 17 determines whether a starting point of the contact (dragging) by the contact object detected in Step S301 is in an upper portion (the upper screen area) of the display unit 11. In a case in which the starting point of the dragging is in the upper portion of the display unit 11 (YES), the processing advances to Step S304. In a case in which the starting point of the dragging is not in the upper portion of the display unit 11 (NO), the processing advances to Step S305.

In Step S304, the control unit 17 activates the first application (the first function) associated with the upper screen area. The control unit 17 causes a character string to be input into a character input area, or causes an image to be input into an image input area, and causes the display unit 11 to perform displaying. The control unit 17 may automatically activate the first application (the first function) upon detecting an ending point.

In Step S305, the control unit 17 activates the second application (the second function) associated with the lower screen area, the second application being different from the first application. The control unit 17 causes a character string to be input into a character string input area, or causes an image to be input into an image input area, and causes the display unit 11 to perform displaying. The control unit 17 may automatically activate the second application (the second function) upon detecting an ending point.

The areas associated with the applications to be activated are not limited to the example (the upper screen area and the lower screen area) described above, and may be three or more areas.

The control unit 17 may activate a different function in accordance with whether the ending point of the contact (dragging) is in the upper screen area or in the lower screen area.

As a result, the mobile telephone device 1 can easily select an application to be activated, simply by changing a starting point of sweeping with a finger or the like. The mobile telephone device 1 can easily activate an application with a small number of operations.

Next, a sixth specific example is described. FIGS. 16 A-B represent an eleventh transition diagram showing a screen displayed on the touch panel 10.

In a case in which at least a part of an image is selected in accordance with detecting contact by the detection unit 12 in a state where the image is displayed on the display unit 11, it is preferable for the control unit 17 to execute processing as follows. More specifically, the control unit 17 activates a further different function in accordance with whether a partial area is which partial area of the displayed image.

For example, in a case in which an image is divided into four areas (an upper right area, an upper left area, a lower left area, and a lower right area), the control unit 17 determines which area is touched by a contact object such as a finger or a stylus, based on a result of detection by the detection unit 12. The control unit 17 activates a function associated with the area that is touched by the contact object.

As a specific example, an image displayed on the touch panel 10 (the display unit 11) is divided into four areas (the upper right area, the upper left area, the lower left area, the and lower right area). A function of storing an image is assigned to the upper right area. A function of attaching an image is assigned to the upper left area. A function of setting an image as wall paper is assigned to the lower left area. A function of registering an image is assigned to the lower right area. In a case in which a finger touches the lower right area of the image (see FIG. 16A), the control unit 17 determines which area (here, the lower right area) is touched, based on a result of detection by the detection unit 12. The control unit 17 activates a function assigned to the lower right area that was touched. More specifically, the control unit 17 registers the image displayed on the display unit 11 with the address book, and causes the display unit 11 to display information that the registration is completed ("image: cake.png") (see FIG. 16B).

As a result, the mobile telephone device 1 can easily select a function to be executed, simply by changing a position to be touched with a finger or the like. Moreover, the mobile telephone device 1 can execute a function with a small number of operations.

It should be noted that the present invention is not limited to the embodiment described above, and can be implemented as various embodiments.

In the aforementioned embodiment, the examples have been described, in which the functions are activated correspondingly to a direction of movement or traveling time of a finger or the like that touches the touch panel 10 (the display unit 11), or the functions are activated correspondingly to a position of a finger or the like that touches the touch panel 10 (the display unit 11). However, the present invention is not limited to the embodiment, and an appropriate function can be activated by, for example, performing character recognition of a selected character string. For example, in a case in which a character string displayed on the touch panel 10 (the display unit 11) is selected with a finger, the control unit 17 performs character recognition of the character string thus selected. As a result of character recognition, in a case in which the selected character strings is composed of numeric characters of any of 3 digits, 10 digits and 11 digits, the control unit 17 determines that the selected character strings is a telephone number, and activates the telephone function. As a result of character recognition, in a case in which the selected character string is composed of alphabetic character, or in a case in which the selected character string is composed of alphabetic characters and numeric characters, the control unit 17 determines that the selected character string is a URL, and activates the web function to cause the selected character string to be input as the URL.

What is claimed is:

1. An electronic device, comprising:
   a display unit configured to display a character string or an image;
   a detection unit configured to detect a movement of a physical body while contacting with the display unit; and
   a control unit,
   wherein,
   when the detection unit detects the movement of the physical body on the character string or the image displayed on the display unit, the control unit is configured to cause at least a part of the character string or the image to be selected in accordance with the detected movement,
   when the at least part of the character string or the image is selected in accordance with the detected movement by the detection unit, the control unit is configured to activate a function in accordance with (i) a length of time of the detected movement on the selected part of the character string or image and (ii) a moving speed of the detected movement relative to the character string or the image, and
   cause the selected character string or the image to be utilized in the activated function, and
   when the at least part of the character string or the image is selected in accordance with the detected movement by the detection unit, the control unit is configured to
   in response to detecting that a starting point of the detected movement is in a predetermined area of a first screen displayed on the display unit, said predetermined area including the area of displaying the character string or the image,
   automatically activate a first function, and
   replace the first screen with a second screen corresponding to the activated first function and displaying the selected at least part of the character string or the image,
   in response to detecting that the starting point of the detected movement is not in the predetermined area of the first screen displayed on the display unit,
   automatically activate a second function different from the first function, and
   replace the first screen with a third screen corresponding to the activated second function and displaying the selected at least part of the character string or the image.

2. The electronic device according to claim 1, wherein, when the at least part of the character string or the image is selected in accordance with the detected movement by the detection unit, the control unit is configured to activate a further function different from the first and second functions, in accordance with an area of displaying the character string or the image on the display unit where the movement was detected.

3. The electronic device according to claim 1, wherein the control unit is configured to activate a further function different from the first and second functions, in accordance with whether an object selected in accordance with the detected movement by the detection unit is the at least part of the character string or the image.

4. The electronic device according to claim 1, wherein, when the at least part of the character string is selected in accordance with detected movement by the detection unit, in a state where the character string is displayed on the display unit, the control unit is configured to activate a further function different from the first and second functions, in accordance with a type of the selected at least part of character string.

5. The electronic device according to claim 1, wherein, when the at least part of the character string is selected in accordance with detected movement by the detection unit, in a state where the character string is displayed on the display unit, the control unit is configured to activate a further function different from the first and second functions, in accordance with whether the selected at least part of the character string is a numeric character string or a character string other than the numeric character string.

6. The electronic device according to claim 1, wherein, when at least a partial area of an area in which the image is displayed is selected in accordance with the detected movement by the detection unit, in a state where the image is displayed on the display unit, the control unit is configured to activate a further function different from the first and second functions, in accordance with the selected partial area of the image.

7. A method of controlling an electronic device including a display unit, a detection unit, and a control unit, said method comprising:
   displaying a character string or an image on the display unit;
   detecting a movement of a physical body while contacting with the character string or the image displayed on the display unit;
   selecting at least a part of the character string or the image in accordance with the detected movement on the character string or the image displayed on the display unit;
   activating, when the at least part of the character string or the image is selected in accordance with the detected movement, a function in accordance with (i) a length of time of the detected movement on the selected part of the character string or image and (ii) a moving speed of the detected movement relative to the character string or the image; and
   utilizing the selected character string or image in the activated function,
   wherein
   when the at least part of the character string or the image is selected in accordance with the detected movement by the detection unit,
   in response to detecting that a starting point of the detected movement is in a predetermined area of a first screen displayed on the display unit, said predetermined area including the area of displaying the character string or the image,
   a first function is automatically activated, and the first screen is replaced with a second screen corresponding to the activated first function and displaying the selected at least part of the character string or the image, and in response to detecting that the starting point of the detected movement is not in the predetermined area of the first screen displayed on the display unit, a second function is automatically activated, and the first screen is replaced with a third screen corresponding to the activated second function and displaying the selected at least part of the character string or the image.

8. A non-transitory storage medium storing thereon control program for causing an electronic device including a display unit, a detection unit, and a control unit to execute:

displaying a character string or an image on the display unit;

detecting a movement of a physical body while contacting with the character string or the image displayed on the display unit;

selecting at least a part of the character string or the image in accordance with the detected movement on the character string or the image displayed on the display unit;

activating, when the at least part of the character string or the image is selected in accordance with the detected movement, a function in accordance with (i) a length of time of the detected movement on the selected part of the character string or image and (ii) a moving speed of the detected movement relative to the character string or the image; and utilizing the selected character string or image in the activated function, wherein when the at least part of the character string or the image is selected in accordance with the detected movement by the detection unit, in response to detecting that a starting point of the detected movement is in a predetermined area of a first screen displayed on the display unit, said predetermined area including the area of displaying the character string or the image, a first function is automatically activated, and the first screen is replaced with a second screen corresponding to the activated first function and displaying the selected at least part of the character string or the image, and in response to detecting that the starting point of the detected movement is not in the predetermined area of the first screen displayed on the display unit, a second function is automatically activated, and the first screen is replaced with a third screen corresponding to the activated second function and displaying the selected at least part of the character string or the image.

\* \* \* \* \*